(12) United States Patent
Barger

(10) Patent No.: US 7,828,381 B2
(45) Date of Patent: Nov. 9, 2010

(54) RECLINE MECHANISM FOR A CHILD RESTRAINT SEAT

(75) Inventor: Jeffery A. Barger, Greenville, OH (US)

(73) Assignee: Evenflo Company, Inc., Miamisburg, OH (US)

(*) Notice: Subject to any disclaimer, the term of this patent is extended or adjusted under 35 U.S.C. 154(b) by 146 days.

(21) Appl. No.: 12/150,650

(22) Filed: Apr. 30, 2008

(65) Prior Publication Data

US 2009/0273216 A1     Nov. 5, 2009

(51) Int. Cl.
    *B60N 2/28*     (2006.01)
(52) U.S. Cl. .............. 297/256.13; 297/256.16
(58) Field of Classification Search ............. 297/250.1, 297/256.13, 256.16, 327, 328
See application file for complete search history.

(56) References Cited

U.S. PATENT DOCUMENTS

| | | | |
|---|---|---|---|
| 4,632,456 A * | 12/1986 | Kassai | ............... 297/328 |
| 5,181,761 A | 1/1993 | Meeker | |
| 5,277,472 A | 1/1994 | Freese et al. | |
| 5,335,964 A | 8/1994 | Sedlack et al. | |
| 5,380,062 A | 1/1995 | Nania | |
| 5,551,751 A | 9/1996 | Sedlack et al. | |
| 5,609,393 A | 3/1997 | Meeker et al. | |
| 5,746,478 A | 5/1998 | Lumley et al. | |
| 6,139,101 A | 10/2000 | Berringer et al. | |
| 6,170,911 B1 | 1/2001 | Kassai et al. | |
| 6,428,099 B1 * | 8/2002 | Kain | ............... 297/256.1 |
| 6,491,343 B2 | 12/2002 | Yamazaki | |
| 6,554,358 B2 * | 4/2003 | Kain | ............... 297/256.13 |
| 6,705,675 B1 | 3/2004 | Eastman et al. | |
| 6,705,676 B1 | 3/2004 | Berringer et al. | |
| 6,857,700 B2 | 2/2005 | Eastman et al. | |
| 7,059,677 B2 | 6/2006 | Balensiefer et al. | |
| 7,246,855 B2 | 7/2007 | Langmaid et al. | |

* cited by examiner

*Primary Examiner*—Peter R. Brown
(74) *Attorney, Agent, or Firm*—Taft Stettinius & Hollister LLP

(57) ABSTRACT

A mechanism for securing a seat carriage at a plurality of recline angles relative to a seat base. Embodiments of the mechanism are attached to a seat carriage and include a coupling device, which has a plurality of recesses which may be selectively engaged with or disengaged from one or more rods attached to the seat base. A handle operates the coupling device.

15 Claims, 4 Drawing Sheets

RECLINE MECHANISM FOR A CHILD RESTRAINT SEAT

BACKGROUND OF THE INVENTION

This invention relates generally to the field of child restraint seats adapted for use in vehicles and, more particularly, to mechanisms for adjusting the recline angle of a child restraint seat.

BRIEF SUMMARY OF THE INVENTION

Embodiments of the present invention include a mechanism for securing a seat carriage at a plurality of recline angles relative to a seat base. The mechanism is attached to the seat carriage and includes two coupling devices, each of which has a plurality of recesses which may be selectively engaged with or disengaged from one or more rods attached to the seat base. A handle operates the coupling devices.

In a first aspect, a child restraint seat according to the present invention may include a base adapted to releasably couple with a vehicle seat, a seat carriage adapted to couple with the base such that a recline angle of the seat carriage relative to the base is adjustable, wherein the seat or the base includes at least one rod and the other of the seat or the base includes at least one coupling device, the coupling device being pivotable relative to the at least one rod and including slots adapted to engage the at least one rod.

In a detailed embodiment of the first aspect, the rod may be oriented generally perpendicular to a line extending from a forward end of the vehicle to a rear end of the vehicle and the at least one coupling device may pivot about an axis generally parallel with the line. In another detailed embodiment of the first aspect, the child restraint seat may include a handle operatively coupled to the coupling device such that actuating the handle causes pivoting of the coupling device. The handle may be pivotable about an axis, the axis being located between a portion on which a user may apply a force and a portion in contact with the coupling device. In yet another detailed embodiment of the first aspect, the coupling device may include a metal plate having a plurality of slots. The metal plate may be mounted to a plastic shell. In another detailed embodiment of the first aspect, the base may include two rods and the seat carriage may include two coupling devices. Each of the coupling devices may include a plurality of slots adapted to engage with at least one of the rods. In another detailed embodiment of the first aspect, the seat carriage may be releasably coupled to the seat base.

In a second aspect, a method of adjusting the recline angle of a child restraint seat according to the present invention may include the steps of providing a restraint seat, the restraint seat including a seat carriage, a seat base, and an adjustment mechanism, the adjustment mechanism including at least one rod mounted to the base and at least one coupling device mounted to the seat carriage and adapted to engage the at least one rod, the adjustment mechanism being operable by a handle; applying a force to the handle, thereby disengaging the coupling device from the at least one rod; adjusting the recline angle of the seat carriage relative to the base; and releasing the handle, thereby allowing the coupling device to engage the at least one rod.

In a detailed embodiment of the second aspect, the coupling device may be pivotable about an axis generally perpendicular to an axis of the at least one rod. In another detailed embodiment of the second aspect, the adjustment mechanism may include two rods mounted to the base and two coupling devices mounted to the seat carriage. In yet another detailed embodiment of the second aspect, the step of applying a force to the handle may include the step of squeezing the handle towards a seat portion of the seat carriage.

In a third aspect, a child restraint seat according to the present invention may include a seat base adapted to be secured to a seat in a vehicle; a seat carriage coupled to the seat base; at least one rod mounted to the seat base; at least one coupling device mounted to the seat carriage and engageable with the at least one rod; and a handle operable to engage and disengage the coupling device to and from the rod such that an angle of the seat carriage relative to the base may be adjustable when the at least one coupling device is disengaged from the at least one rod.

In a detailed embodiment of the third aspect, the child restraint seat may include two of the coupling devices. Each of the coupling devices may be pivotable about a horizontal axis to engage and disengage the at least one rod. The coupling devices may be pivotable in opposite directions, such that each coupling device is pivotable towards a center of a seat portion of the seat carriage to disengage the at least one rod and each coupling device is pivotable away from the center of the seat portion of the seat carriage to engage the at least one rod. The child restraint seat may include two of the rods. The rods may be mounted to the seat base oriented in a direction generally perpendicular to a line extending from a front of the vehicle to a rear of the vehicle. The rods may be generally horizontal.

BRIEF DESCRIPTION OF THE SEVERAL VIEWS OF THE DRAWING

The detailed description particularly refers to the accompanying Figures in which.

DETAILED DESCRIPTION OF THE INVENTION

Figure 1:
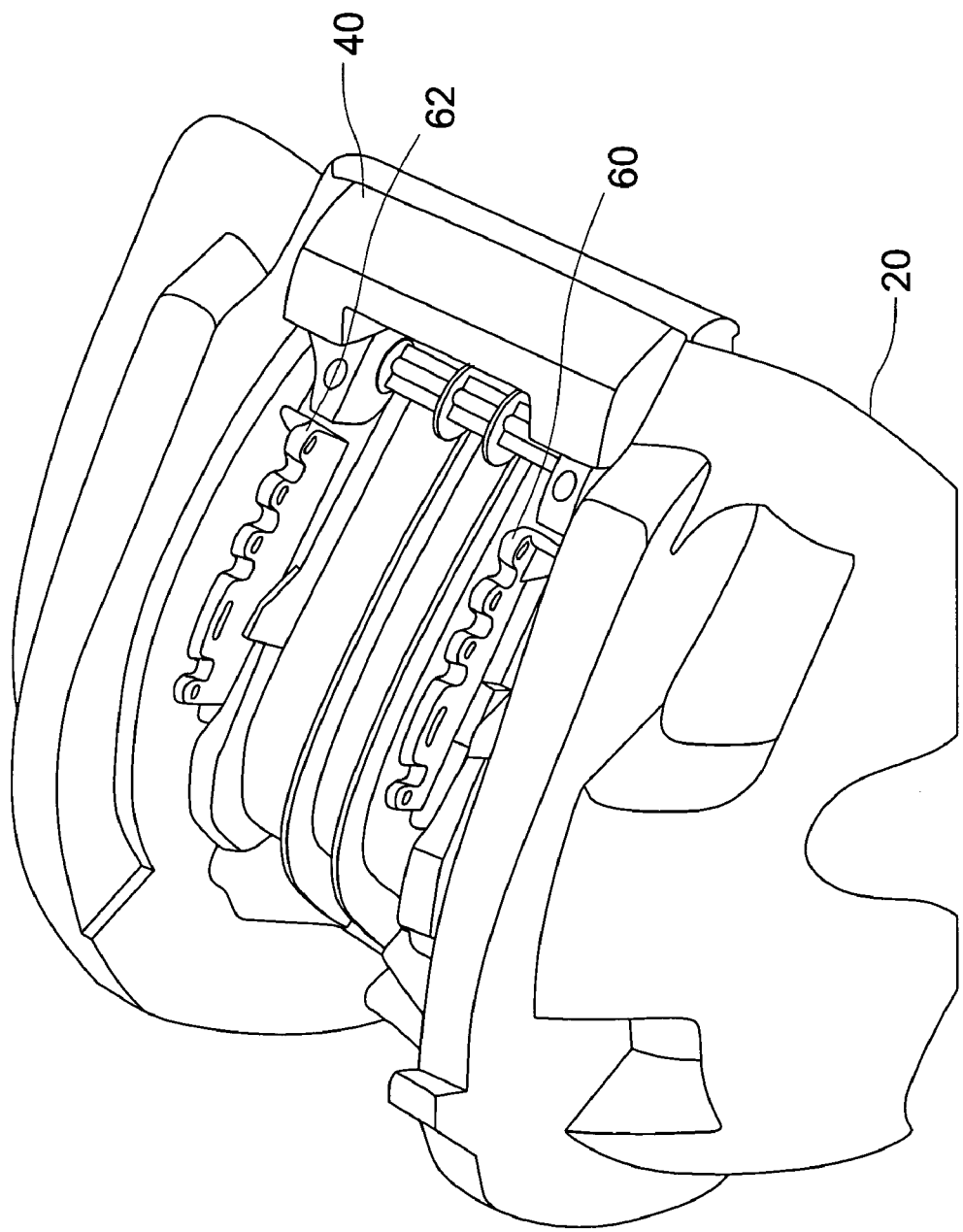
FIG. 1 is a perspective view of an inverted exemplary embodiment of a seat carriage according to the present invention.
Figure 2:
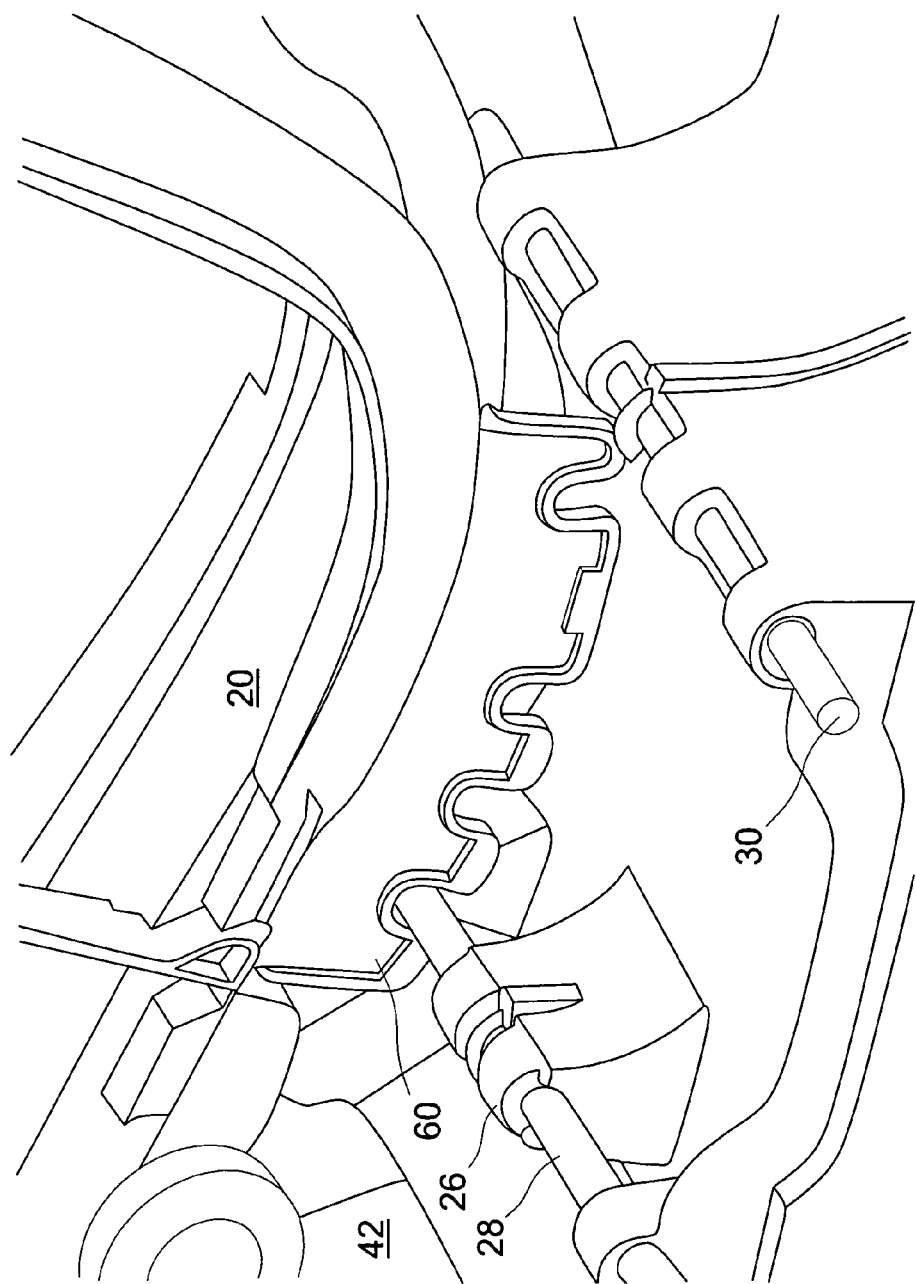
FIG. 2 is a cutaway view of an exemplary embodiment of the present invention showing the engagement of the seat carriage with the base.

A seat carriage 20 may include a seat back portion and a seat portion. The seat may include one or more padded portions, harnesses, etc. as are well known in the art of child restraint seats. The seat carriage 20 may be adapted to be supported by a seat base 26 that is secured to the seat of a vehicle.

As used herein, the term recline angle refers to the angular position of the seat carriage 20 relative to the base 26. Accordingly, a change in the recline angle results in a change in the inclination of the seat back portion relative to the base 26.

The seat carriage 20 may include a handle 40 and coupling devices 60, 62 that extend beneath the seat portion 24 of the seat carriage 20. The description herein primarily addresses the construction and operation of the present invention recline mechanism as exemplified by coupling device 60. It is to be understood that the exemplary embodiment shown in the Figures includes coupling device 62 in addition to coupling device 60. Further, it is to be understood that coupling device 62 is constructed and operated similarly to coupling device 60 with the obvious exception that coupling device 62 may be a mirror-image of coupling device 60.

Handle 40 may include a contact portion 42 that is adapted to be grasped by a user. In the exemplary embodiment, a user may apply a force to contact portion 42 by squeezing it towards seat carriage 20, thereby rotating handle 40 about pivots 48 as discussed below. It is within the scope of the invention to construct the handle 40 to be operable by any actuation method (such as, but not limited to, pulling, pushing, sliding, etc.) instead of and/or in addition to squeezing. The bottom of the seat carriage 20 includes pivot points 32 which are adapted to engage pivots 48 of handle 40.

Coupling device 60 is adapted to engage at least one rod mounted on the seat base 26, such as at least one of rods 28, 30, which are mounted on the seat base 26. When the coupling devices 60, 62 are engaged with at least one of rods 28, 30, seat carriage 20 is fixed in position relative to base 26. Thus, the angle of recline of the seat carriage 20 cannot be adjusted when coupling devices 60, 62 are engaged with at least one of rods 28, 30.

Coupling device 60 is adapted to pivot out of engagement with rod 30 when the handle 40 is actuated by application of force to contact surface 42. When the coupling devices are disengaged from rods 28, 30, the angle of recline of the seat carriage 20 may be adjusted.

Coupling device 60 includes shell 64, plate 66, and spring 68. Shell 64 is composed of molded plastic and includes recesses 80, 82, 84, 86 which are adapted to engage at least one of rods 28, 30. Shell 64 includes a tab 100 having an edge 102. Slot 104 extends through the entire length of the coupling device 60 and is adapted to receive an axial member. Spring 68 is attached to coupling device 60 adjacent to tab 100 such that slot 104 is within coil 114.

Figure 4:
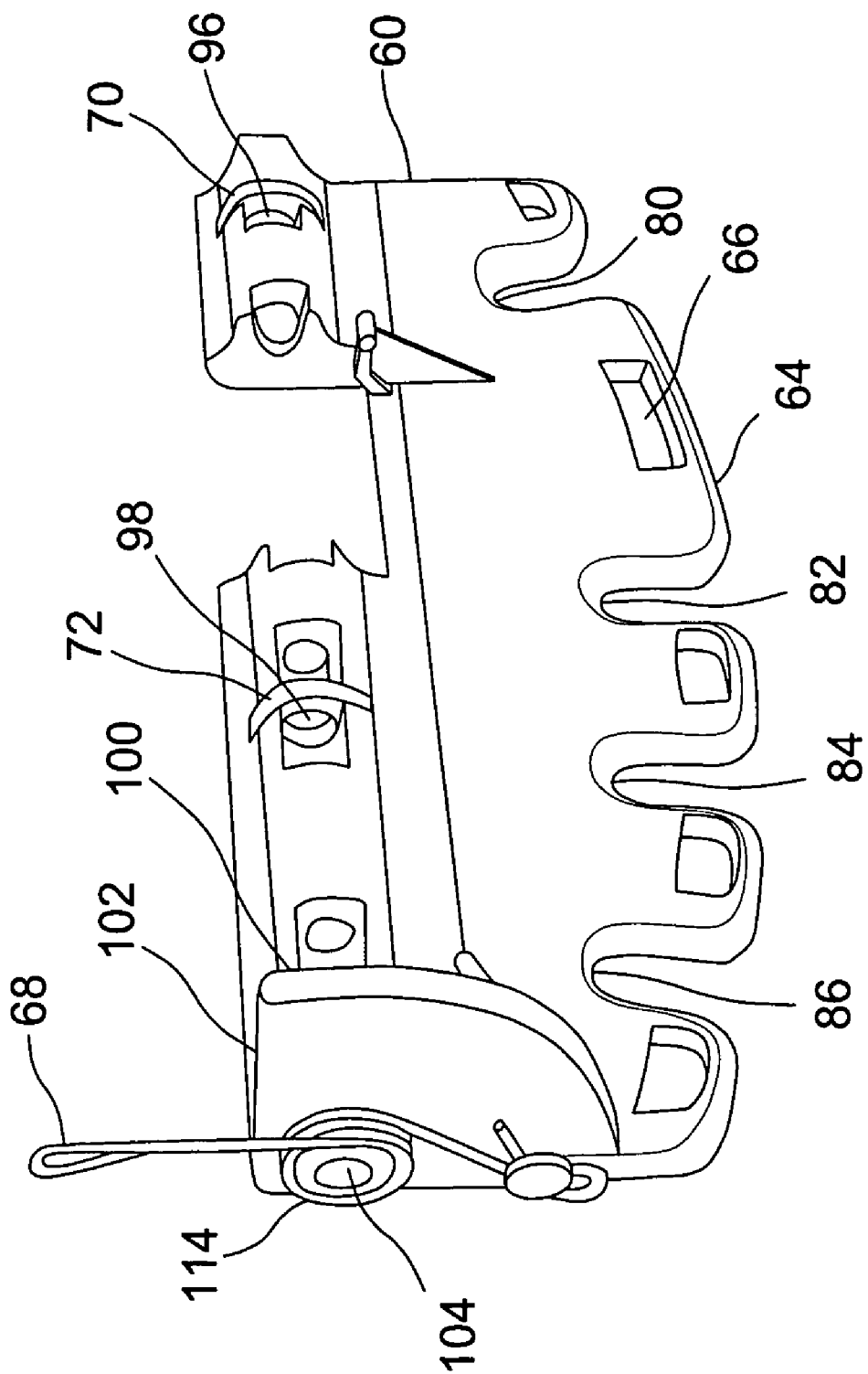
FIG. 4 is a perspective view of an exemplary embodiment of a coupling device according to the present invention.

Plate 66 is composed of metal and includes recesses that correspond to recesses 80, 82, 84, and 86 on shell 64. Tabs 70, 72 extend from plate 66. Tabs 70, 72 and the respective holes 96, 98 are adapted to engage shell 64 as shown in FIG. 4. Holes 96, 98 line up with slot 104 such that the axial member may lie within the slot 104 and extend through holes 96, 98.

Shell 64 includes an inset portion that is approximately the same size and shape as plate 66. Slots are adapted to receive tabs 70, 72. Because shell 64 includes the inset portion for plate 66, any sharp edges on plate 66 are covered by shell 64. This feature may be particularly advantageous in embodiments in which seat carriage 20 is removable from base 26.

Spring 68 includes coil 114 near its midpoint. The spring 68 biases coupling device 60 rotationally towards the engaged position such that when handle 40 is released, coupling device 60 is engaged with rods 28, 30. As such, spring 68 also effectively biases handle 40 toward the released position because edge 102 is in contact with contact portion 44 of handle 40. Thus, when a user operates handle 40 by applying a force to contact portion 42, the user must overcome the force of spring 68 to change the position of handle 40 and coupling device 60.

Figure 3:
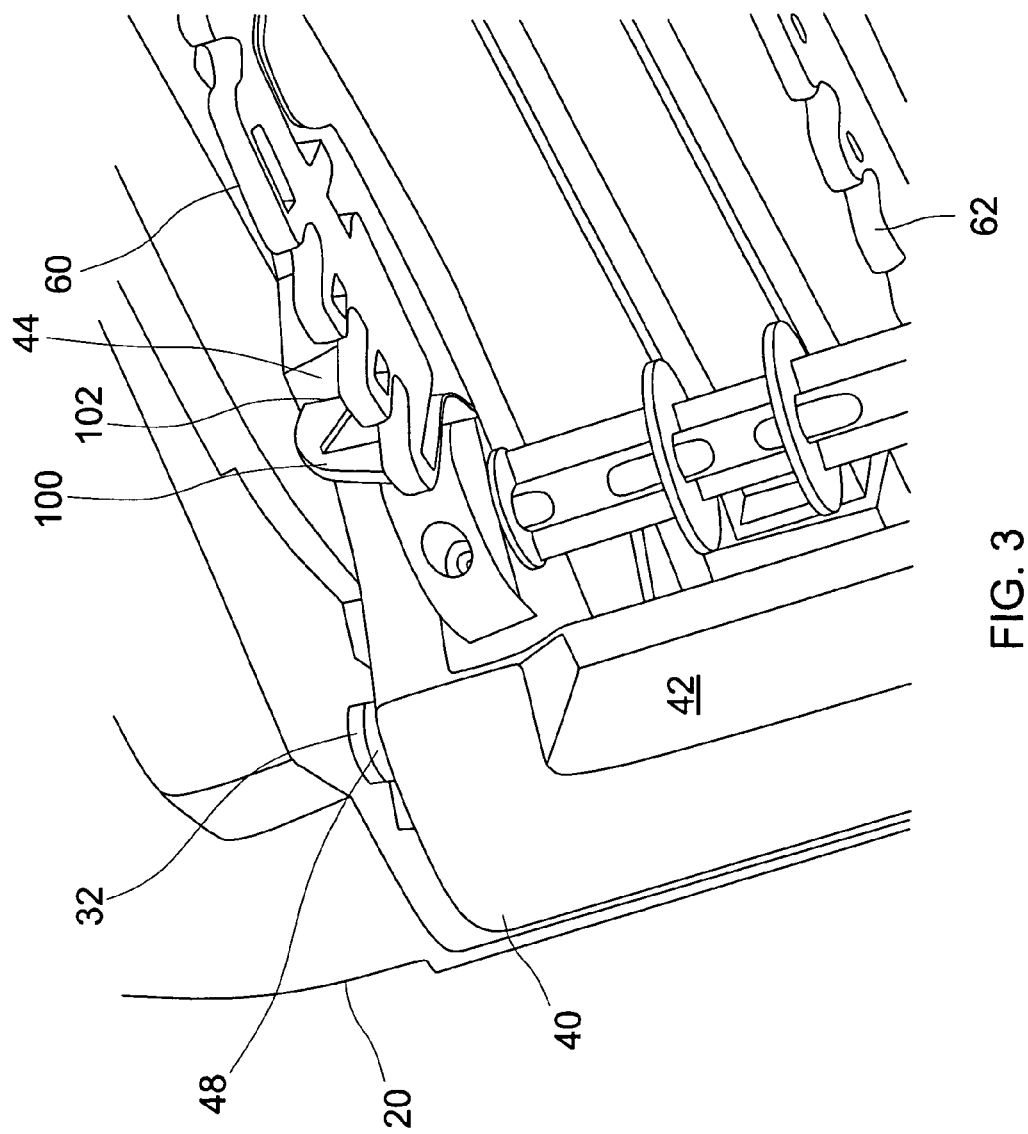
FIG. 3 is a detailed perspective view of the underside of a portion of an exemplary embodiment of a seat carriage according to the present invention.

As shown in FIG. 3, handle 40 includes pivots 48, contact surfaces 44, and contact portion 42.

As is visible in FIG. 1, coupling devices 60, 62 are slightly splayed outward when handle 40 is released.

To operate the recline mechanism, a user grasps the front of the seat carriage 20 and the handle 40. The user squeezes the handle 40 towards the seat carriage 20 by applying force to contact surface 42. This causes the handle 40 to rotate about pivots 48, thereby causing contact surface 44 of handle 40 to push on contact surface 102 of coupling device 60. Pushing on contact surface 102 causes coupling device 60 to rotate about the axial member, thus disengaging the recesses 80, 82, 84, 86 from rods 28, 30. Similarly, the rotation of the handle 40 causes a corresponding contact surface to push on coupling device 62, thereby causing coupling device 62 to rotate and disengage from rods 28, 30. Once coupling devices 60, 62 are disengaged from rods 28, 30, the user may adjust the recline angle of the seat carriage by moving the seat carriage relative to the base. When seat carriage 20 is at the desired angle, the user releases handle 40, allowing spring 68 and the corresponding spring associated with coupling device 62 to rotate coupling devices 60, 62 to engage with at least one of rods 28, 30.

While exemplary embodiments of the invention have been set forth above for the purpose of disclosure, modifications of the disclosed embodiments of the invention as well as other embodiments thereof may occur to those skilled in the art. Accordingly, it is to be understood that the inventions contained herein are not limited to the above precise embodiments and that changes may be made without departing from the scope of the invention as defined by the claims. Likewise, it is to be understood that the invention is defined by the claims and it is not necessary to meet any or all of the stated advantages or objects of the invention disclosed herein to fall within the scope of the claims, since inherent and/or unforeseen advantages of the present invention may exist even though they may not have been explicitly discussed herein.

What is claimed is:

1. A child restraint seat comprising:
   a base adapted to releasably couple with a vehicle seat;
   a seat carriage repositionably coupled to the base by a repositionable mount which allows the seat carriage to be moved relative to base while concurrently being mounted to the base;
   wherein one of the seat carriage and the base includes at least one rod and the other of the seat carriage and the base includes at least one coupling, the coupling being pivotable relative to the at least one rod and including a plurality of slots engaging the at least one rod;
   wherein the repositionable mount enables a recline angle of the seat carriage to change relative to the base by changing which of the plurality of slots receives the at least one rod; and
   wherein the at least one rod is oriented generally perpendicular to a line extending from a forward end of a vehicle to a rear end of the vehicle and the at least one coupling pivots about an axis generally parallel with the line.

2. The child restraint seat of claim 1, further comprising a handle operatively coupled to the coupling such that actuating the handle causes pivoting of the coupling.

3. The child restraint seat of claim 2, wherein the handle is pivotable about an axis, the axis being located between a portion on which a user may apply a force and a portion in contact with the coupling.

4. The child restraint seat of claim 1, wherein the coupling includes a metal plate having a plurality of slots.

5. The child restraint seat of claim 4, wherein the metal plate is mounted to a plastic shell.

6. The child restraint seat of claim 1, wherein the base includes two rods spaced apart from one another in parallel and extending laterally across the base and the seat carriage includes two couplings.

7. The child restraint seat of claim 6, wherein each of the couplings includes a plurality of slots adapted to engage with at least one of the rods.

8. The child restraint seat of claim 1, wherein the seat carriage is releasably coupled to the seat base.

9. A method of adjusting the recline angle of a child restraint seat, comprising the steps of:

provic a restraint seat, the restraint seat including a seat carriage repositionably mounted to a seat base by a repositionable mount, and an adjustment mechanism mounted to the seal carriage and seat base, the adjustment mechanism including at least one rod and at least one coupling engaging the at least one rod at least one of a plurality of engagement locations, the adjustment mechanism also including a handle;

applying a force to the handle, thereby disengaging a first of the plurality of engagement locations of the coupling from the at least one rod;

adjusting the recline angle of the seat carriage relative to the base by repositioning the restraint seat relative to the seat carriage via the repositionable mount; and releasing the handle, thereby allowing a second of the plurality of engagement locations of the coupling to engage the at least one rod to inhibit repositioning of the restraint seat relative to the seat carriage via the seat mount;

wherein the first of the plurality of engagement locations is different than the second of the plurality of engagement locations; and wherein the at least one coupling is pivotable about an axis generally perpendicular to an axis of the at least one rod.

10. The method of claim 9, wherein the adjustment mechanism includes two rods mounted to the base and two couplings mounted to the seat carriage.

11. The method of claim 9, wherein the step of applying a force to the handle includes the step of squeezing the handle towards a seat portion of the seat carriage.

12. A child restraint seat comprising:

a seat base adapted to be secured to a seat in a vehicle;

a seat carriage repositionably coupled to the seat base via a repositionable mount;

an angular recline adjustor mounted to the seat carriage and the seat base to allow for angular adjustment of the seat carriage with respect to the seat base, the recline adjustor including at least one rod;

a coupling, wherein the coupling comprises a first coupling and a second coupling wherein each of the first coupling and the second coupling is pivotable about a horizontal axis to engage and disengage the rod and wherein the first coupling and the second coupling are pivotable in opposite directions such that each coupling is pivotable towards a center of a seat portion of the seat carriage to disengage the at least one rod and wherein each coupling is pivotable away from the center of the seat portion of the seat carriage to engage the at least one rod;

the recline adjustor further including a handle operable to reposition at least one of the coupling and the rod; wherein the handle is operative to change a longitudinal position of the coupling with respect to the rod.

13. The child restraint seat of claim 12, wherein the rod comprises a first rod and a second rod spaced apart from one another in parallel and extending laterally across the seat base.

14. The child restraint seat of claim 13, wherein the first rod and the second rod are mounted to the seat base and oriented in a direction generally perpendicular to a line extending from a front of a vehicle to a rear of the vehicle.

15. The child restraint seat of claim 14, wherein the first rod and the second rod are generally horizontal.

\* \* \* \* \*